(No Model.)
H. R. RODEN
HARROW.
No. 458,114. Patented Aug. 18, 1891.
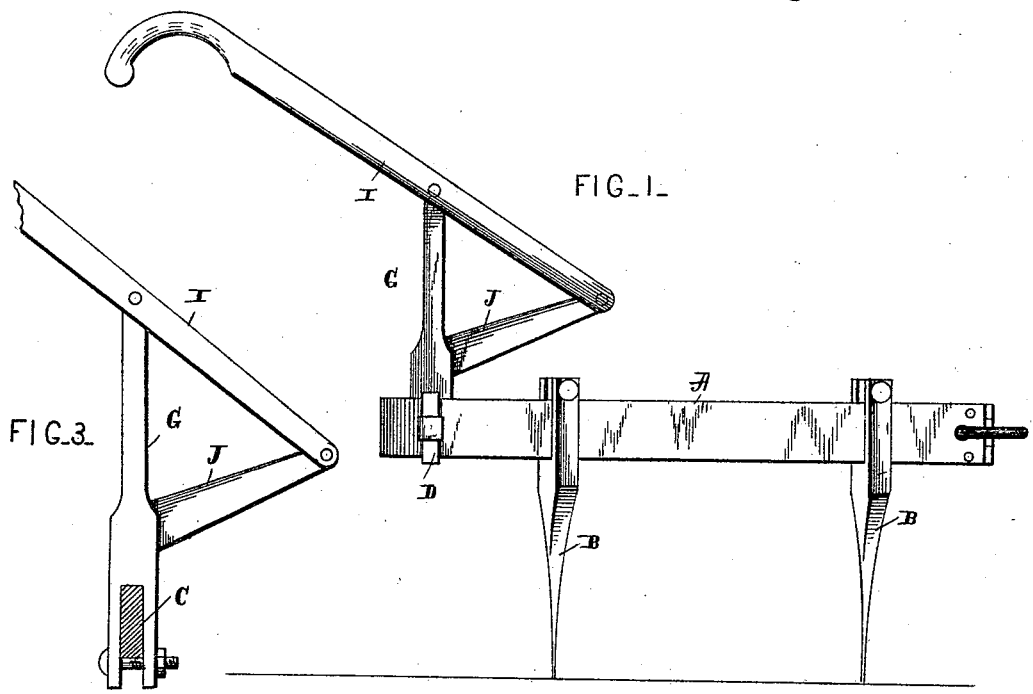
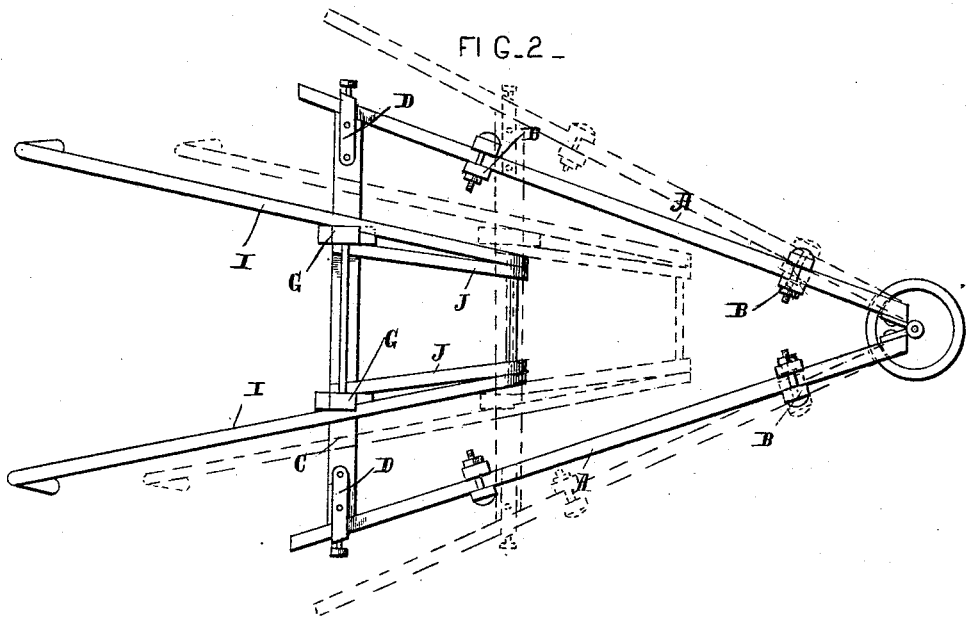
WITNESSES
Geo. E. Frech.
Roland A. Fitzgerald
INVENTOR
H. R. Roden,
per
Lehmann & Pattison,
attys

UNITED STATES PATENT OFFICE.

HORACE RAFORD RODEN, OF LIBERTY HILL, LOUISIANA.

HARROW.

SPECIFICATION forming part of Letters Patent No. 458,114, dated August 18, 1891.

Application filed April 25, 1891. Serial No. 390,415. (No model.)

*To all whom it may concern:*

Be it known that I, HORACE RAFORD RODEN, of Liberty Hill, in the parish of Bienville and State of Louisiana, have invented certain new and useful Improvements in Harrows; and I do hereby declare the following to be a full, clear, and exact description of the invention, such as will enable others skilled in the art to which it pertains to make and use it, reference being had to the accompanying drawings, which form part of this specification.

My invention relates to an improvement in harrows; and it consists in two side beams which are loosely connected at their front ends, combined with a sliding cross-bar, forked standards upon which the handles are pivoted, supporting-rods for the front ends of the handles, and suitable teeth which are applied to the beams, as will be more fully described hereinafter.

The object of my invention is to produce a harrow which can be expanded and contracted at will and upon which the teeth are adjusted back and forth to correspond to the position of the side bars.

Figure 1 is a side elevation of a harrow which embodies my invention. Fig. 2 is a plan view of the same. Fig. 3 is a detail view of one of the handle-supports.

A represents the two side bars, which are hinged or otherwise loosely connected at their front ends, so that they can be widened out or closed inwardly at the will of the operator. These side bars will be preferably made of iron; but they may be made of any other suitable material. The teeth B, attached to these side bars, have their upper ends forked, so as to straddle the bars from the under side, and which are then secured in place by clamping-bolts passed through their upper ends. These bolts serve to hold the teeth in position as long as the bolts are screwed tightly in place; but when the bolts are slackened the teeth can be moved back and forth upon the bars, so as to correspond to the position into which the bars are adjusted.

The rear ends of the bars are held in any desired position by means of the cross-bar C, which is provided with loops or cuffs D, which slide freely back and forth upon the bars A and which are fastened in any desired position by means of set-screws. If it is desired to open out the side bars A, this cross-bar C is forced forward any suitable distance, thereby forcing their rear ends any desired distance apart.

Mounted upon the cross-bar C are the two standards G, which are forked at their lower ends, so as to straddle down over the top of the cross-bar, and which are fastened into position by means of bolts passed through their lower ends. Pivoted upon the upper ends of these standards G are the handles I, which have their lower front ends to extend forward any desired distance, and these front ends are pivoted to the braces J, which are secured at their rear ends to the standards G. These braces being secured at their front ends to the front ends of the handles and at their rear ends to the standards, they support the handles rigidly in position, and thus allow the cross-bar C to be adjusted freely back and forth upon the side bars at the will of the operator. This construction enables all other cross-bars than the one C to be dispensed with, and thus allows this cross-bar to be freely moved back and forth without in any way interfering with the handles.

Any other form of teeth than the ones B may be used in connection with the side bars, and I do not limit myself in this respect.

Having thus described my invention, I claim—

1. In an agricultural implement, a cross-bar combined with standards which rise therefrom, the handles pivoted to the upper ends of the standards, and the braces which are fastened both to the front ends of the handles and to the standards, substantially as shown.

2. In an agricultural implement, the side bars loosely hinged or connected at their front ends, the sliding cross-bar, the handle-standards, and the handles and the braces secured, as described, so as to slide with the cross-bar, substantially as set forth.

In testimony whereof I affix my signature in presence of two witnesses.

HORACE RAFORD RODEN.

Witnesses:
J. M. COLVIN,
A. H. COLVIN, Jr.